United States Patent
Eraslan et al.

(10) Patent No.: US 11,064,006 B2
(45) Date of Patent: Jul. 13, 2021

(54) DEVICE AND SYSTEM FOR ACCESSING MULTIPLE VIRTUAL ASSISTANT SERVICES

(71) Applicant: Flex Ltd., Singapore (SG)

(72) Inventors: Mesut Gorkem Eraslan, San Jose, CA (US); Bruno Dias Leite, San Jose, CA (US)

(73) Assignee: Flex Ltd., Singapore (SG)

( * ) Notice: Subject to any disclaimer, the term of this patent is extended or adjusted under 35 U.S.C. 154(b) by 0 days.

(21) Appl. No.: 16/682,492

(22) Filed: Nov. 13, 2019

(65) Prior Publication Data

US 2020/0152176 A1  May 14, 2020

Related U.S. Application Data

(63) Continuation of application No. 16/023,048, filed on Jun. 29, 2018, now abandoned.

(Continued)

(51) Int. Cl.
*G10L 15/08* (2006.01)
*H04L 29/08* (2006.01)
*G10L 15/22* (2006.01)

(52) U.S. Cl.
CPC .............. *H04L 67/00* (2013.01); *G10L 15/08* (2013.01); *G10L 15/22* (2013.01); *H04L 67/2842* (2013.01); *G10L 2015/088* (2013.01)

(58) Field of Classification Search
CPC .............. G10L 15/08; G10L 2015/088; H04L 67/2842

(Continued)

(56) References Cited

U.S. PATENT DOCUMENTS 8,032,383 B1 10/2011 Bhardwaj et al.
2009/0018832 A1* 1/2009 Mukaigaito ............. G10L 15/26
                                                             704/251

(Continued)

FOREIGN PATENT DOCUMENTS

KR      20000069024 A  * 11/2000  ............ H04M 7/003
WO      WO 02/49253          6/2002

OTHER PUBLICATIONS

M. Farkhadov, V. Smirnov and A. Eliseev, "Application of speech analytics in information space monitoring systems," 2017 5th International Conference on Control, Instrumentation, and Automation (ICCIA), Shiraz, 2017, pp. 92-97, doi: 10.1109/ICCIAutom.2017.8258659. (Year: 2017).*

(Continued)

*Primary Examiner* — Bharatkumar S Shah
(74) *Attorney, Agent, or Firm* — Sheridan Ross P.C.

(57) ABSTRACT

A listening device that identifies, based on receiving the digitized voice stream, a first keyword of a plurality of keywords in the digitized voice stream. For example, the keyword may be a name associated with a service provider (e.g., "Google"). In response to identifying the first keyword of the plurality of keywords in the digitized voice stream the listening device identifies a first communication address of a first communication server of a first service provider associated with the first keyword of the plurality of keywords in the digitized voice stream. The listening server then routes the digitized voice stream and/or information associated with the digitized voice stream to the first communication server of the first service provider using the first communication address.

18 Claims, 7 Drawing Sheets

Related U.S. Application Data (60) Provisional application No. 62/654,090, filed on Apr. 6, 2018.

(58) Field of Classification Search
USPC .......................................................... 704/251
See application file for complete search history.

(56) References Cited

U.S. PATENT DOCUMENTS

| | | | |
|---|---|---|---|
| 2010/0198595 A1 | 8/2010 | Wlasiuk | |
| 2014/0188478 A1* | 7/2014 | Zhang | G10L 15/22 704/257 |
| 2014/0214429 A1* | 7/2014 | Pantel | G10L 15/32 704/275 |
| 2015/0161989 A1* | 6/2015 | Hsu | G10L 15/08 704/251 |
| 2018/0007205 A1 | 1/2018 | Klein et al. | |
| 2019/0102145 A1* | 4/2019 | Wilberding | G06F 3/04817 |
| 2019/0311710 A1 | 10/2019 | Eraslan et al. | |

OTHER PUBLICATIONS

A. Mohan and A. Mohan, "Voice enabled request and response for mobile devices supporting WAP protocol," Vehicular Technology Conference Fall 2000. IEEE VTS Fall VTC2000. 52nd Vehicular Technology Conference (Cat. No. OOCH37152), Boston, MA, USA, 2000, pp. 2736-2743 vol. 6, doi: 10.1109/VETECF.2000. (Year: 2000).*

R. V. Cox, B. G. Haskell, Y. LeCun, B. Shahraray and L. Rabiner, "On the applications of multimedia processing to communications," in Proceedings of the IEEE, vol. 86, No. 5, pp. 755-824, May 1998, doi: 10.1109/5.664272. (Year: 1998).*

International Search Report and Written Opinion for International (PCT) Patent Application No. PCT/IB2018/000833, dated Nov. 2, 2018, 14 pages.

Official Action for U.S. Appl. No. 16/023,048, dated May 24, 2019 7 pages, Restriction Requirement.

Official Action for U.S. Appl. No. 16/023,048, dated Aug. 15, 2019 15 pages.

International Report on Patentability for International (PCT) Patent Application No. PCT/IB2018/000833, dated Oct. 15, 2020, 9 pages.

* cited by examiner

DEVICE AND SYSTEM FOR ACCESSING MULTIPLE VIRTUAL ASSISTANT SERVICES

CROSS REFERENCE TO RELATED APPLICATION

The present application is a continuation of and claims priority to U.S. patent application Ser. No. 16/023,048, filed on Jun. 29, 2018, entitled "DEVICE AND SYSTEM FOR ACCESSING MULTIPLE VIRTUAL ASSISTANT SERVICES," which claims the benefits of and priority, under 35 U.S.C. § 119(e), to U.S. Provisional Application Ser. No. 62/654,090, filed on Apr. 6, 2018, entitled "DEVICE AND METHOD FOR MULTIPLE SPEECH RECOGNITION SERVICES WITH VOICE SWITCHING." The entire disclosure of the applications listed above is hereby incorporated by reference, in its entirety, for all that it teaches and for all purposes.

FIELD

The present invention is related generally virtual assistant services and specifically to a virtual assistant service platform.

BACKGROUND

Human voice or human speech is one of the methods humans can interact with a device. There are many examples of such interaction within a consumer smart home, a remote control system, an automobile, and the like. Such interaction is typically integrated into a device that can access an individual cloud service. There are companies such as Amazon® , Google® and others who offer their cloud speech recognition services to third parties in order to develop devices to capture human speech for sending information to a vendor's specific cloud speech recognition service. In some cases, these companies also sell devices that are specific to the company providing the service.

DETAILED DESCRIPTION

Figure 1:
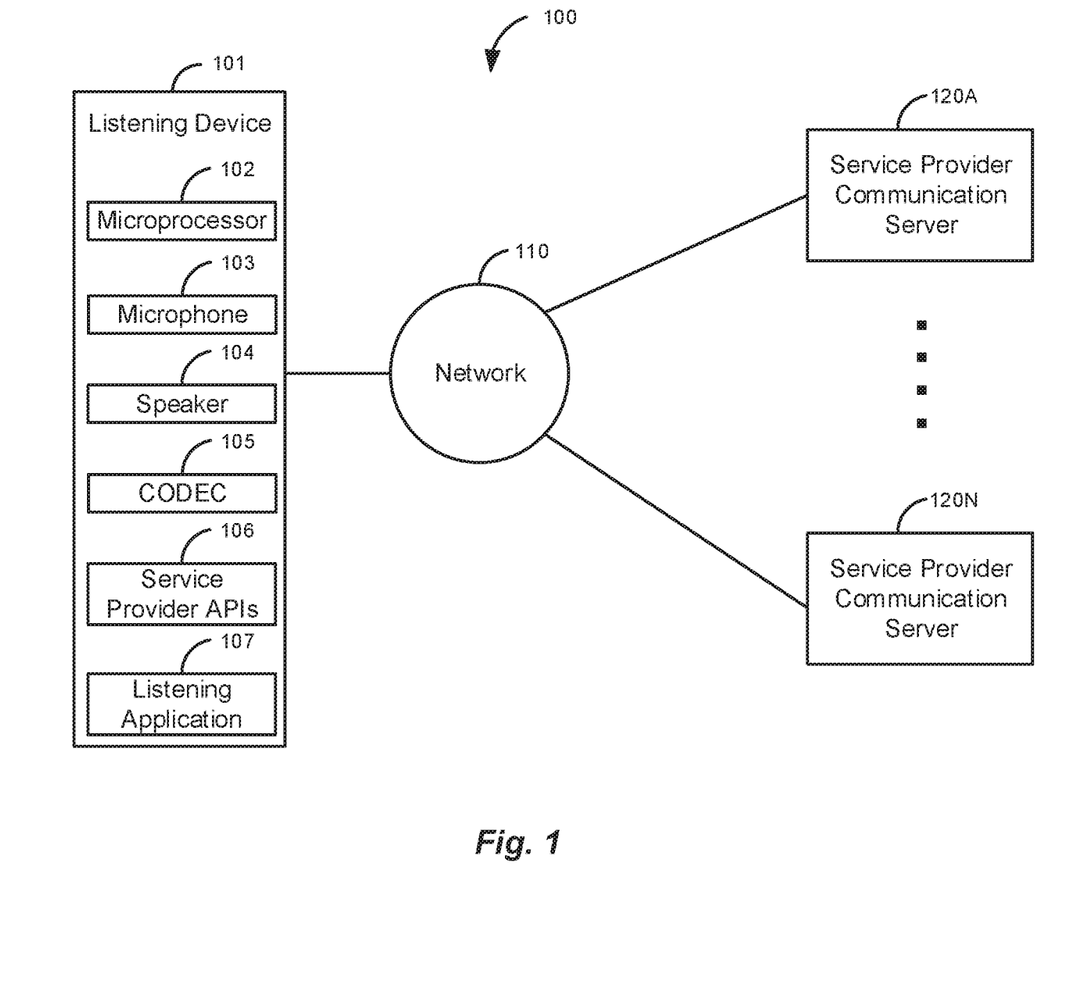
FIG. 1 is a block diagram of a first illustrative system for managing multiple speech recognition services with voice switching.

FIG. 1 is a block diagram of a first illustrative system 100 for managing multiple speech recognition services with voice switching. The first illustrative system 100 comprises a listening device 101, a network 110, and service provider communication servers 120A-120N. The listening device 101 can be or may include any user device that can send and receive voice information on the network 110, such as a Personal Computer (PC), a self-contained listening device 101, a telephone, a personal home assistant, a tablet device, and the like. In FIG. 1, only a single listening device 101 is shown for simplicity. However, any number of listening devices 101 may be connected to the network 101.

The listening device 101 further comprises a microprocessor 102, a microphone 103, a speaker 104, a coder/encoder (codec) 105, service provider Application Programming Interfaces (APIs) 106, and a listening application 107. The microprocessor 102 can be or may or can include any known microprocessor 102, such as a microcontroller, an application specific microprocessor 102, a digital signaling processor, a multi-core processor, and/or the like.

The microphone 103 can be or may include any type of microphone, such as dynamic microphone, a cardioid microphone, a super/hyper cardioid microphone, an omnidirectional microphone, a pattern microphone, a diaphragm size microphone, a condenser microphone, a ribbon microphone, and/or the like.

The speaker 104 can be or may any type of speaker, such as an electrodynamic loud speaker, a flat panel speaker, a planar speaker, a multi-cell diaphragm speaker, a headphone, a plasma arc speaker, piezoelectric speaker, a plurality of speakers (e.g., a woofer, a mid-range, and a tweeter) and/or the like.

The codec 105 can be any coder/encoder that can take an analog signal from the microphone 103 and turn the analog signal into a digitized voice stream. The codec 105 includes an analog to digital converter. The codec 105 can be or may include a linear pulse code modulation codec, a pulse density modulation codec, a direct stream digital codec, a pulse amplitude modulation codec, free lossless audio codec, an MPEG 4 codec, and/or the like.

The service provider Application Programming Interfaces (APIs) 106 can be or may include any API that is provided by a service provider that allows access to a service provider communication server 120. The service provider APIs 106 may work in a variety of ways. For example, the service provider APIs 106 may establish a voice communication session (using data provided by the codec 105) from the listening device 101 to the service provider communication server 120. Alternatively, the service provider APIs 106 may allow the listening device 101 to communicate with the service provider communication server 120 using text. For example, the listening device 101 may convert the audio signal from the codec 105 to text and communicate with the service provider communication server 120 using text. Likewise, the service provider communication server 120 may respond back using text.

The listening application 107 can be or may include any software that can provide an interface between the codec 105 and the service provider APIs 106. The listening application 107 can listen for one or more keywords to determine if a communication session needs to be established with one or more service provider communication servers 120 and/or if information needs to be sent to the one or more service provider communication servers 120.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Web Real-Time Protocol (WebRTC), Integrated Services Digital Network (ISDN), and the like. Thus, the network 110 is an electronic communication network configured to carry messages via packets and/or circuit switched communications.

The service provider communication servers 120A-120N can be or may include any communication servers that can provide communication services (e.g., speech recognition services, voice assistant, virtual assistant) from different companies and/or vendors. The service provider communication servers 120A-120N may provide the same types of services and/or completely different services. For example, the service provider communication servers 120A-120N may provide similar services for ordering goods from the service providers (e.g., groceries and household goods). Alternatively, the service provider communication server 120A may provide car purchasing services and the service provider 120N may provide dictionary services.

Figure 2:
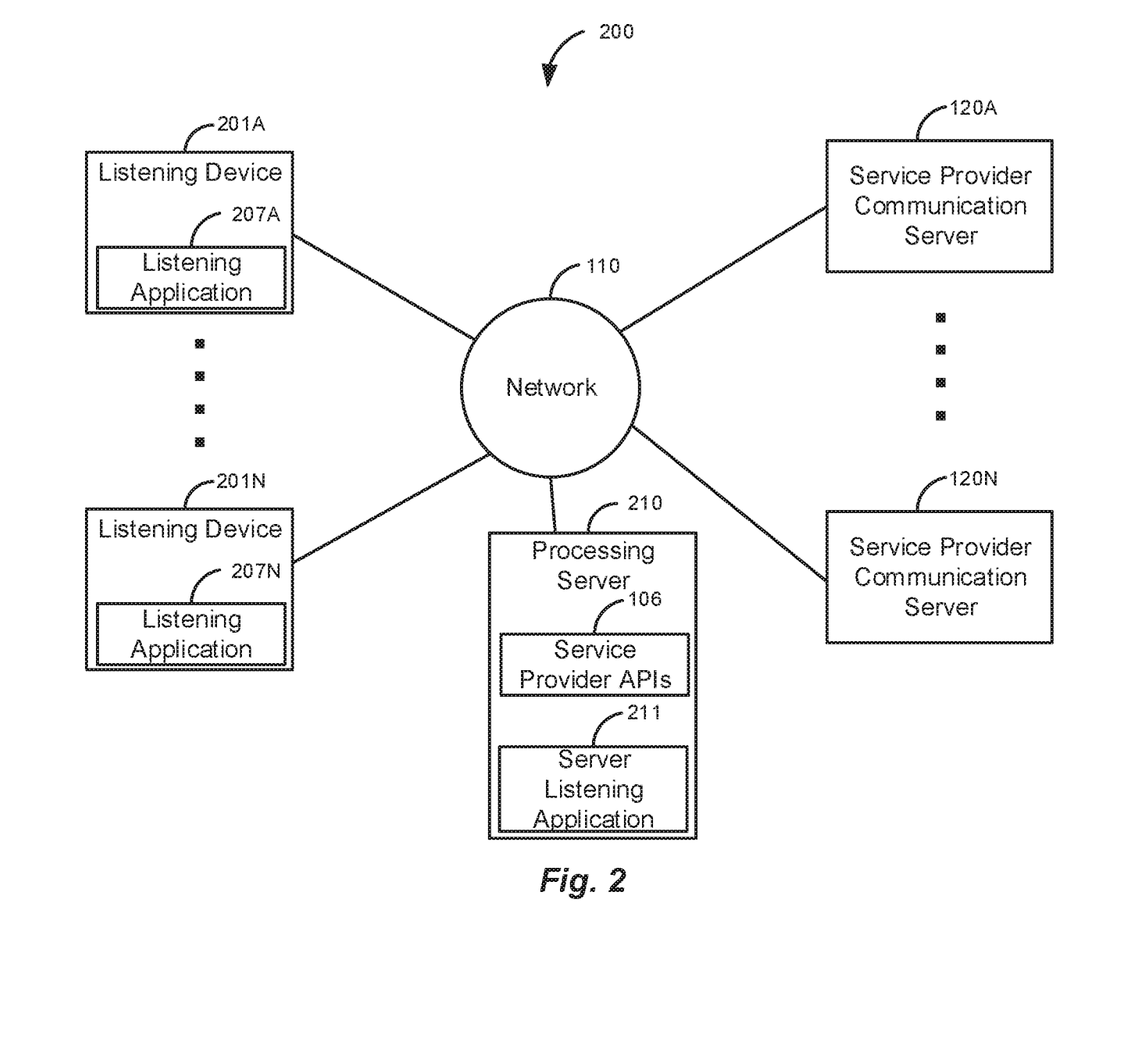
FIG. 2 is a block diagram of a second illustrative distributed system for managing multiple speech recognition services.

FIG. 2 is a block diagram of a second illustrative distributed system 200 for managing multiple speech recognition services. The second illustrative distributed system 200 comprises listening devices 201A-201N, the network 110, a processing server 210 and the service provider communication servers 120A-120N.

The listening devices 201A-201N are typically a limited version of the listening device 101. For example, the listening devices 201A-201N will typically have the microprocessor 102, the microphone 103, the speaker 104, the codec 105, and a limited version of the listening application 107 (listening application 207). The listening application 207 in the listening devices 201A-201N may only be a simple application that establishes a voice communication session between listening device 201 and the processing server 210. Alternatively, the listening application 207 in the listening devices 201A-201N may convert an audio stream to text and send the text to the processing server 210.

The processing server 210 can be or may include any hardware coupled with software that can manage the flow of information between the listening devices 201A-201N and the service provider communication servers 120A-120N. The processing server 210 further comprises the service provider APIs 106 and a server listening application 211.

The listening server application 211 can receive voice/text streams (along with other pertinent information) from the listening applications 207A-207N. Based on detecting one or more keywords in a digitized voice streams/text received from the listening applications 207A-207N, the server listening application 211 can route the digitized voice streams/information, via the service provider APIs 106, to a specific service provider communication server 120A-120N.

Figure 3:
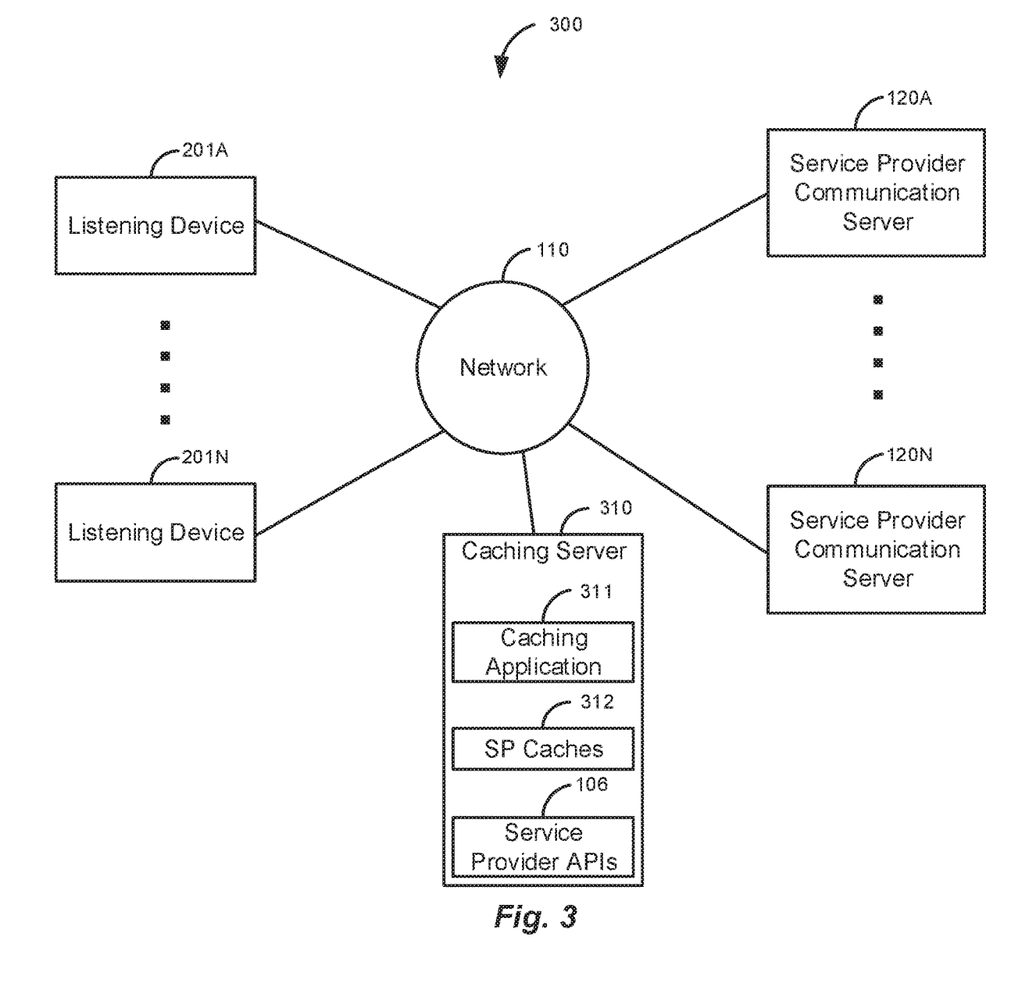
FIG. 3 is a block diagram of a third illustrative system for providing cached services for managing multiple speech recognition services.

FIG. 3 is a block diagram of a third illustrative system 300 for providing cached services for managing multiple speech recognition services. The third illustrative system 300 comprises the listening devices 201A-201N, the service provider communication servers 120A-120N, and a caching server 310.

The caching server 310 can be or may include any hardware coupled with software that can cache requests/responses that are received from the listening devices 101A-101N and the service provider communication servers 120A-120N. The caching server 310 further comprises a caching application 311, service provider caches 312, and the service provider APIs 106.

The caching application 311 and service provider caches 312 can be or may include any software that can receive and temporarily store requests/responses. For example, if a request is made to from an Amazon Alexa® (the listening device 201), where the user states "Alexa, tell me about George Washington," the service provider cache 312 for Amazon® would store the request/response for a time period. Likewise, if another user made the same request from a Google® service (e.g., "Google, tell me about George Washington"), the request/response would be stored in the service provider cache 312 for Google®. What is stored in the service provider caches 312 may be limited to requests/responses that typically have the same response. For example, a request to ask "what time is it" would not be stored in the service provider caches 312 because for this type of request, a different response will be received each time.

An advantage to the caching application 311/service provider caches 312 is that response time can be reduced. For example, if the service provider communication server 120 is heavily congested or at a distant location on the network 110, the response time can be reduced by the caching server 310.

Although FIG. 3 is shown using the listening devices 201A-201N, FIG. 3 may also work with the embodiment shown in FIG. 1. For example, the embodiment of FIG. 3 may work the listening device 101.

Figure 4:
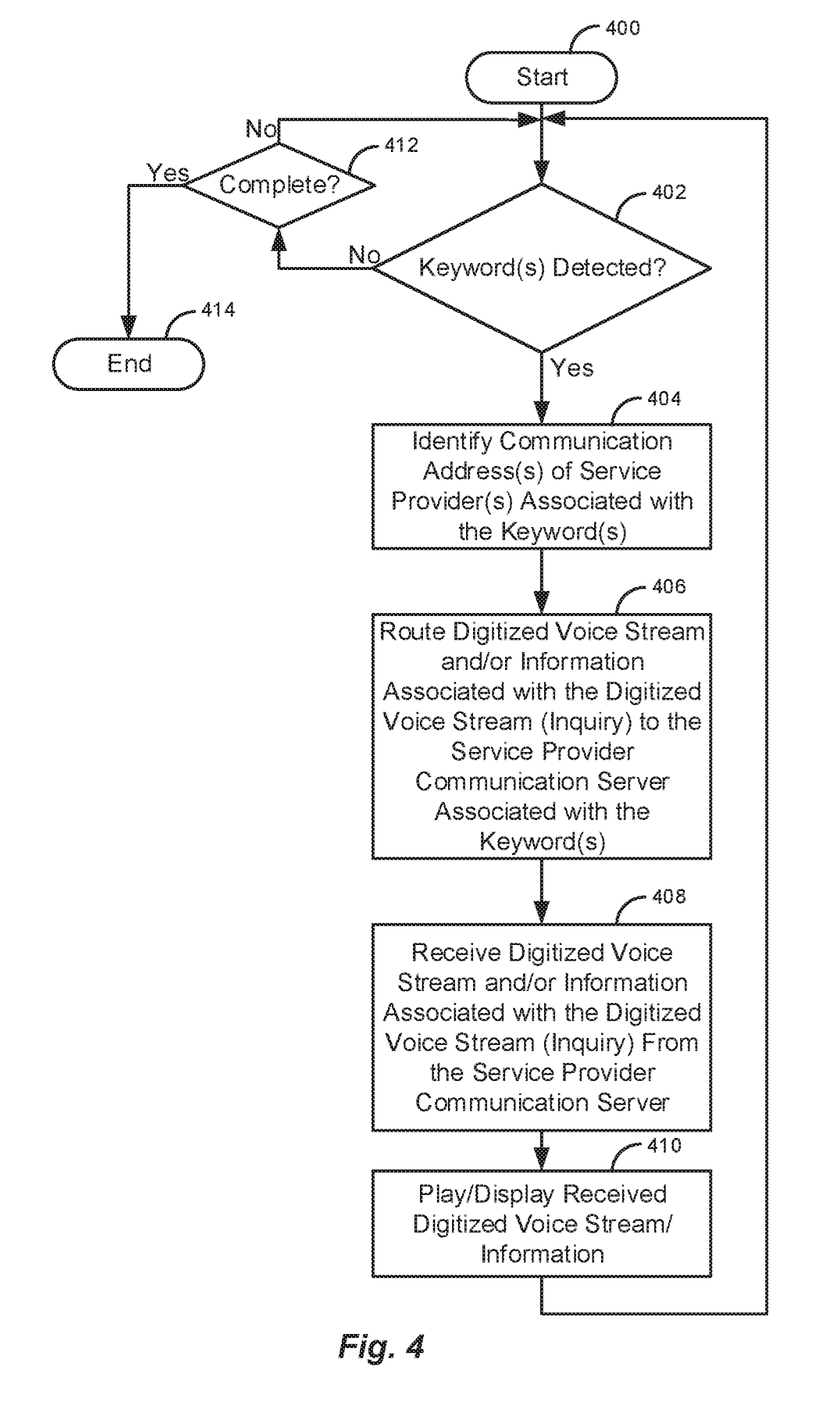
FIG. 4 is a flow diagram of a process for managing multiple speech recognition services.

FIG. 4 is a flow diagram of a process for managing multiple virtual assistant services. Illustratively, the listening device 101, the codec 105, the service provider APIs 106, the listening application 107, the service provider communication servers 120A-120N, the listening devices 201A-201N, the listening applications 207A-207N, the processing server 210, the server listening application 211, the caching server 310, the caching application 311, and the service provider caches 312 are stored-program-controlled entities, such as a computer or microprocessor 102, which performs the method of FIGS. 4-7 and the processes described herein by executing program instructions stored in a computer readable storage medium, such as a memory (i.e., a computer memory, a hard disk, and/or the like). Although the methods described in FIGS. 4-7 are shown in a specific order, one of skill in the art would recognize that the steps in FIGS. 4-7 may be implemented in different orders and/or be implemented in a multi-threaded environment. Moreover, various steps may be omitted or added based on implementation.

The process of FIG. 4 is described using the first illustrative system 100 shown in FIG. 1. The process starts in step 400. The listening application 107 receives an audio stream from the codec 105 (an analog voice signal that is digitized into a voice stream by the codec 105). The listening application 107 determines, in step 402, if a keyword(s) is detected in the digitized voice stream. For example, different service providers may have different keywords that are used to access a service provided by the service provider via the service provider communication server 120. For example, the keyword for the Amazon® service is "Alexa" and the keyword for the Google® service is "Ok Google." If a keyword is not detected in step 402, the listening application 107 determines if the process is complete in step 412. For example, if the user turns off the listening device 101. If the process is complete in step 412, the process ends in step 414.

Otherwise, if the process is not complete in step 412, the process goes back to step 402. If a keyword is detected in step 402, the listening application 107 identifies a communication address of a service provider communication server 120 associated with the keyword in step 404. For example, if the detected keyword is "Alexa," the communication address of the service provider communication server 120 will be for the Amazon® service provider communication server 120. The communication addresses any address that uniquely identifies the service provider communication server 120, such as, an Internet Protocol (IP) address, a Universal Resource Locator (URL), a network address, and/or the like.

The listening application 107 uses the service provider API 106 (for the specific service provider) to route the digitized voice stream and/or information associated with the digitized voice stream (e.g., a text translation) to the service provider communication server 120 associated with the keyword in step 406. For example, if the user at the listening device 101 makes the inquiry "Alexa, what time is it," the listening application 107 detects the keyword "Alexa" in step 402. The listening application 107 determines the communication address of the service provider communication server 120 for Amazon® based on the keyword "Alexa." The listening application 107 routes the digitized voice stream (the digitized voice stream for "what time is it") and/or information associated with the digitized voice stream (converted text for "what time is it") using the service provider API 106 for Amazon®. In other words, in this embodiment, the keyword is not sent to the service provider communication server 120 (although the keyword could be sent in a different embodiment). The service provider communication server 120 for Amazon® responds (e.g., "it is 4:00 PM") via the service provider API 106. The listening application 107 receives the digitized voice stream and/or the information associated with the digitized voice stream (e.g., text) from the service provider communication server 120 via the service provider API 106 in step 408. The listening device 101 plays/displays (e.g., using the speaker 104) the received digitized voice stream/information (e.g., text converted to voice) to the user in step 410. The process then goes to step 402 to listen for a new keyword.

In one embodiment, when a keyword is detected in step 402, the process stays connected to the service provider communication server 120 until a new keyword for a different service provider is spoken. Alternatively, a timeout period may be used where after a time period where the user does not make any inquiries, the system disconnects with the service provider communication server 120 and then enters a listening mode until a new keyword is detected in step 402.

In one embodiment, the user can say multiple keywords together. For example, the user may say "Alexa, Google, how do you make dry ice." In this case, the listening application 107 identifies the communication addresses of the two service provider communication servers 120 in step 404 and then routes the digitized voice stream/information to both the service provider communication servers 120 for Amazon® and Google® in step 406. The received digitized voice stream and/or information for inquiry from both the service provider's communication servers 120 are received in step 408 and then played/displayed in step 410.

Alternatively, the user may define a profile to have queries directed to one or more additional service providers. The profile may identify specific types of queries where a second service provider (a specific service provider) is automatically queried. For example, for car purchases, the user may query (where only one keyword is recognized) multiple service providers automatically based on a user defined profile.

Figure 5:
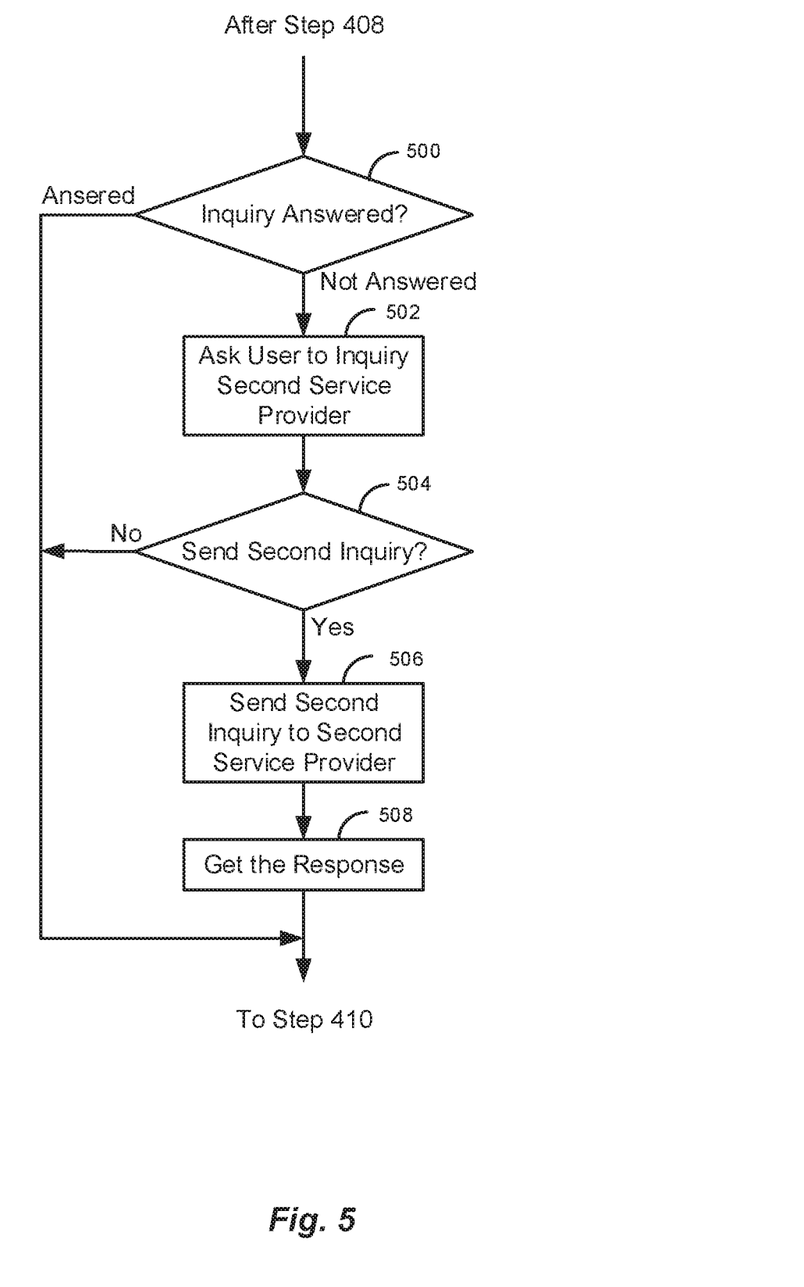
FIG. 5 is a flow diagram for managing inquires between multiple speech recognition services.

FIG. 5 is a flow diagram for managing inquires between multiple virtual assistant services. The process of FIG. 5 may be inserted between step 408 and step 410 of FIG. 4. The listening application 107 determines in step 500 if an answer to the inquiry (e.g., "what time is it") is received from the service provider communication server 120 (e.g., "it is 4:00 PM"). In step 500, the response may indicate that the service provider does not know how to respond or could not understand the question (not just a failure to respond at all). For example, the response from the service provider communication server 120 may say "I do not know how to answer that question." If the inquiry is answered in step 500, the process goes to step 410 where the answer is played/displayed to the user.

Otherwise, if the inquiry is not answered in step 500 (e.g., based on a list of known responses that indicate being unable to respond for each service provider), the listening application 107 asks the user if he/she wants to make an inquiry of a different service provider in step 502. For example, the listening application 107 may state "Alexa does not know how to answer that question. Do you want Google to try and answer that question?" If the user wants to inquiry a second service provider in step 504, the same inquiry (e.g., where the digitized inquiry is stored by the listening application 107) is sent to the second service provider in step 506 (like in step 406). The response is received in step 508 (like in step 408) and is played/displayed in step 410. If the user does not want to send the second inquiry in step 504, the process goes to step 410.

Figure 6:
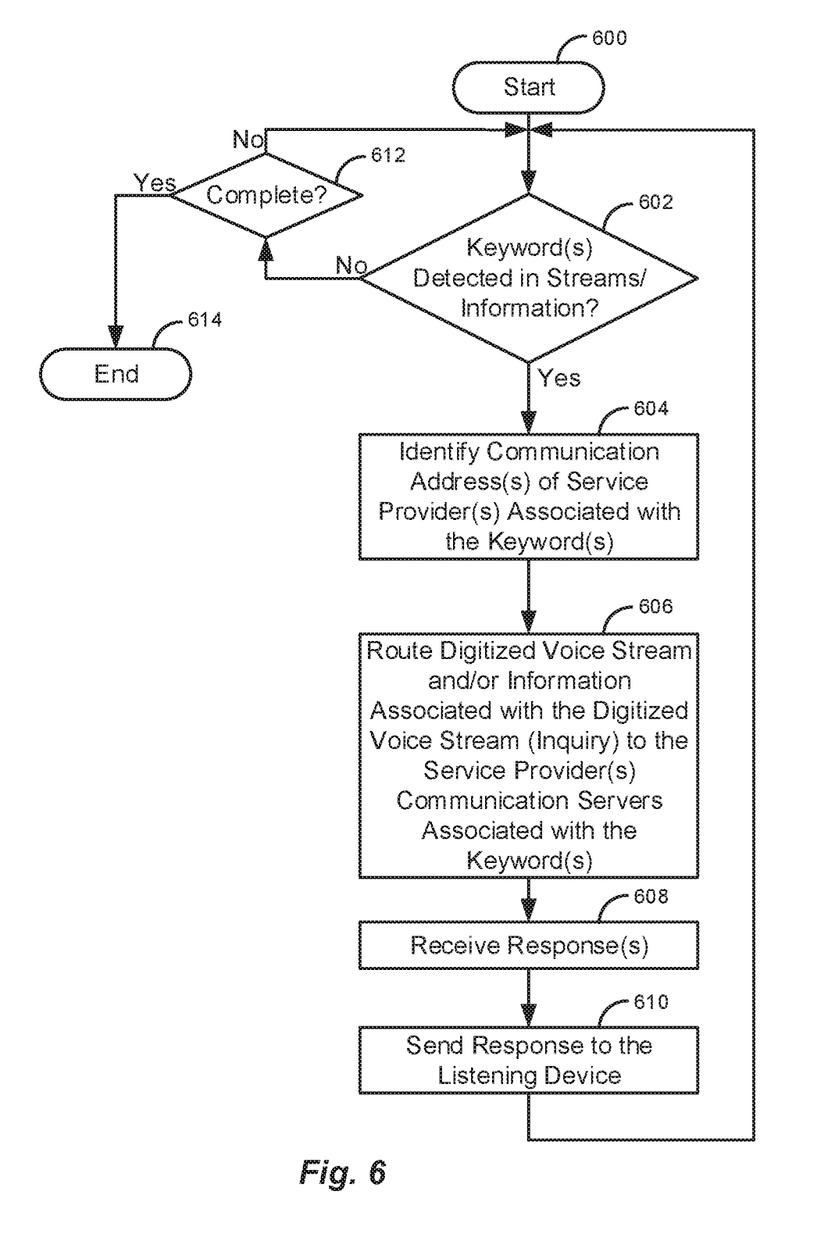
FIG. 6 is a flow diagram for a distributed system for managing multiple speech recognition services.

FIG. 6 is a flow diagram for a distributed system for managing multiple speech recognition services. The process of FIG. 6 is based on FIG. 2. The process starts in step 600. Once the listening devices 201A-201N have established connections with the processing server 210, the server listening application 211 receives the digitized voice stream of the listening devices 201A-201N and/or text of the digitized voice stream. The server listening application 211 determines, in step 602, if a keyword(s) is detected in the digitized voice streams/text information. If a keyword is not detected in step 602, the server listening application 211 determines if the process is complete in step 612. If the process is complete in step 612, the process ends in step 614.

Otherwise, if the process is not complete in step 612, the process goes back to step 602. If a keyword is detected in step 602, the server listening application 211 identifies a communication address of a service provider communication server 120 associated with the keyword in step 604. For example, if the detected keyword is "Alexa," the communication address of the service provider communication server 120 will be for the Amazon® service provider communication server 120.

The server listening application 211 uses the service provider API 106 (for the specific service provider) to route the digitized voice stream and/or information associated with the digitized voice stream (e.g., a text translation) to the service provider communication server 120 associated with the keyword in step 606. For example, if the user at the listening device 201 makes the inquiry "Alexa, what time is it," the server listening application 211 detects the keyword "Alexa" in step 602. The server listening application 211 determines the communication address of the service provider communication server 120 for Amazon® based on the keyword "Alexa." The server listening application 211 routes the digitized voice stream (the digitized voice stream for "what time is it")/information associated with the digitized voice stream (converted text for "what time is it") using the service provider API 106 for Amazon®. In other words, in this embodiment, the keyword is not sent to the service provider communication server 120 (although the keyword could be sent in a different embodiment). The service provider communication server 120 for Amazon® responds (e.g., "it is 4:00 PM") via the service provider API 106. The server listening application 211 receives the digitized voice stream and/or the information associated with the digitized voice stream (e.g., text) via the service provider API 106 in step 608. The server listening application 211 sends the digitized voice stream and/or information associated with the digitized voice stream to the listening device 201 that initiated the inquiry in step 610. The listening device 201 plays/displays (e.g., using the speaker 104) the received digitized voice stream/information (e.g., text converted to voice) to the user. The process then goes to step 602 to listen for a new keyword.

In one embodiment, when a keyword is detected in step 602, the process stays connected (routing inquires) to the service provider communication server 120 until a new keyword for a different service provider is spoken. Alternatively, a timeout period may be used where after a time period where the user does not make any inquiries, the system disconnects with the service provider communication server 120 and then enters a listening mode until a new keyword is detected in step 602.

In one embodiment, the user can say multiple keywords together. For example, the user may say "Alexa, Google, how do you make dry ice." In this case, the server listening application 211 identifies the communication addresses of the two service provider communication servers 120 in step 604 and then routes the digitized voice stream/information to both the service provider communication servers 120 for Amazon® and Google® in step 606. The received digitized voice stream and/or information for inquiry from both the service provider's communication servers 120 are received in step 608 and then sent to the listening device 201 in step 610.

Alternatively, the user may define a profile to have queries directed to one or more additional service providers (stored in the processing server 210). The profile may identify specific types of queries where a second service provider is automatically queried.

Figure 7:
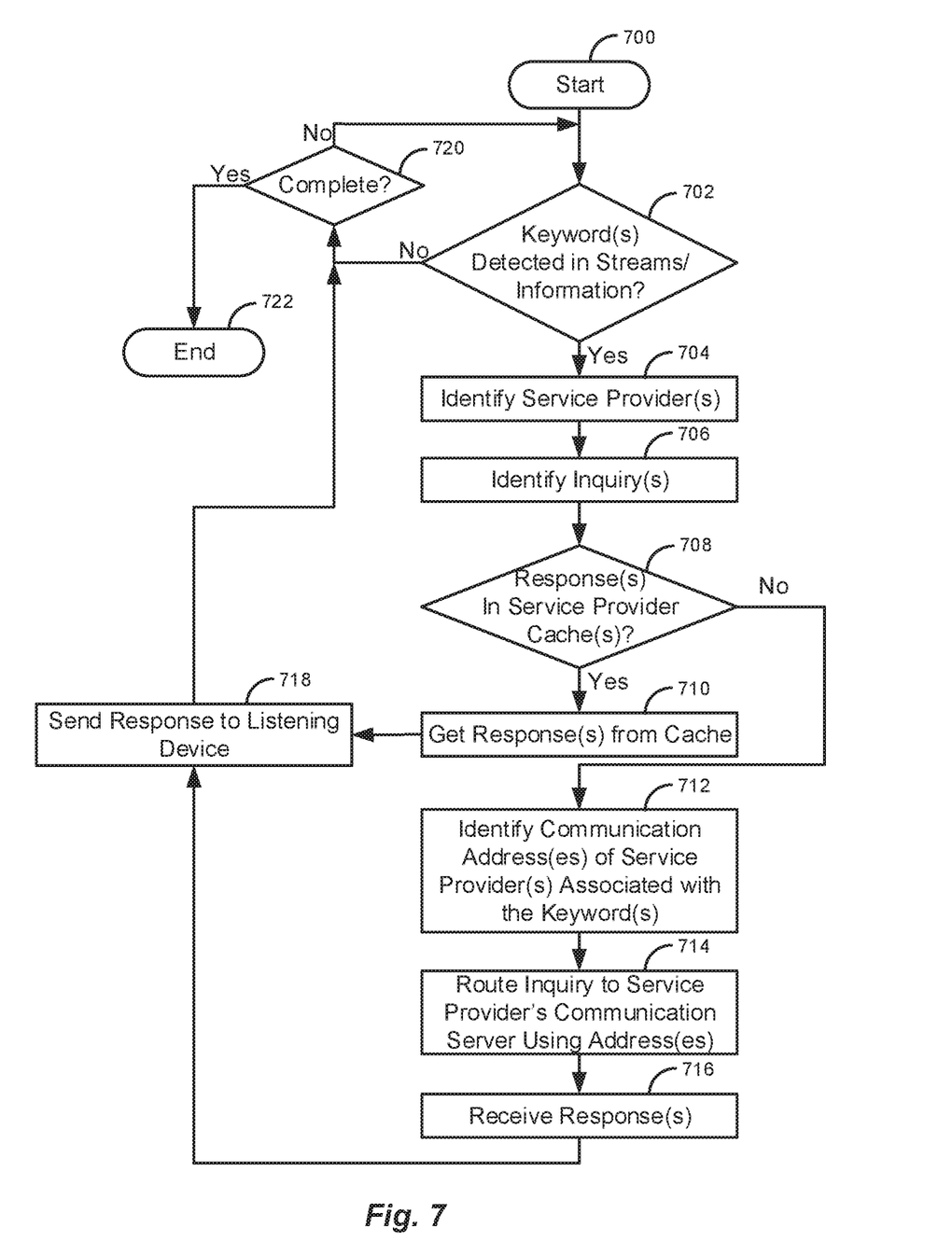
FIG. 7 is a flow diagram of a process for providing cached services for managing multiple speech recognition services.

FIG. 7 is a flow diagram of a process for providing cached services for managing multiple speech recognition services. FIG. 7 is a flow diagram based on FIG. 3. In FIG. 7, the listening devices 201A-201N establish a communication session to the caching server 310. For example, the listening devices 201A-201N may send a digitized voice stream and/or text of the digitized voice stream to the caching server 310.

The process starts in step 700. The caching application 311 detects keyword(s) in the digitized voice streams/information in step 702. If a keyword is not detected in step 702, the caching application 311 determines in step 720 if the process is complete. If the process is complete in step 720, the process ends in step 722. Otherwise, if the process is not complete in step 720, the process goes back to step 702.

If a keyword(s) is detected in step 702 (e.g., "Alexa"), the caching application 311 identifies the service provider associated with the keyword in step 704 (Amazon® in this example). The caching application 311 identifies the inquiry in step 706 (e.g., "how do you make dry ice"). The caching application 311 determines if a response to the inquiry is stored in the service provider's cache 312 in step 708 (e.g., based on a different listening device 201 making the same inquiry). If the response is stored in the service provider's cache in step 708, the caching application 311 gets the response from the service provider cache in step 710 and sends the response to the listening device 201 in step 718. The process then goes to step 720.

Otherwise, if the response is not in the service provider's cache 311 in step 708, the caching application 311 identifies a communication address of a service provider communication server 120 associated with the keyword in step 712. The caching application 311 uses the service provider API 106 (for the specific service provider) to route the digitized voice stream and/or information associated with the digitized voice stream (e.g., a text translation) to the service provider communication server 120 associated with the keyword in step 714. In other words, in this embodiment, the keyword is not sent to the service provider communication server 120 (although the keyword could be sent in a different embodiment). The service provider communication server 120 responds via the service provider API 106. The caching application 311 receives the digitized voice stream and/or the information associated with the digitized voice stream (e.g., text) via the service provider API 106 in step 716. The caching application 311 sends the digitized voice stream and/or information associated with the digitized voice stream to the listening device 201 that initiated the inquiry in step 718. The listening device 201 plays/displays (e.g., using the speaker 104) the received digitized voice stream/information (e.g., text converted to voice) to the user. The process then goes to step 720.

In one embodiment, in step 708, if a response is not found in the service provider's cache 312, the caching application 311 can look at other service provider's caches 312 to see if there is a response to the same inquiry and use this response in step 710.

In one embodiment, the response provided in step 710 may be a response to a similar inquiry, but not identical an identical inquiry. For example, a response may be provided from the service provider caches 312 (same or different service provider) for the inquiry "how do you make dry ice" based on a response to a previous inquiry from a different listening device 201 "how is dry ice made."

In a manner similar to those discussed above, the user can say multiple keywords together. For example, the user may say "Alexa, Ok Google, how do you make dry ice." In this embodiment, the caching application 311 searches both service provider caches 312 (for Amazon® and Google®) to see if there are cached responses. If so, the cached response is gathered from the service provider's caches 312 in step 710. In this case, two responses can be sent in step 712. If only one response is in one of the service provider's cache, the user may still receive two responses (one via step 710 and a second one via steps 712-716). If there are no responses in the service provider's caches 312, then both service provider's communication servers 120 are used in steps 712-716 to get responses from both the service provider's communication servers 120.

The advantage for the caching server 310 is to provide faster access time to inquiries. In addition, the caching server 310 may off load the service provider communication servers 120A-120N.

In one embodiment, when a response is received from the service provider communication server 120, the response is marked as a cacheable response (e.g., that the response is not likely to change each time). If the response is marked as cacheable, the caching application 311 stores the response in the service provider's cache 312.

The caching application 311 may age response in the service provider cache 312 based on time. For example, responses are removed from the service provider cache every 24 hours.

Although not discussed, the detected keyword in step 702 may be a local keyword. For example the user may say "volume up." In this case, the detected keyword will be executed locally and the process would go back to step 702.

Any of the steps, functions, and operations discussed herein can be performed continuously and automatically.

To avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor 102 or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors 102), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor 102 or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor 102, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a device comprising:
a microprocessor;
a microphone;
a codec that converts an analog voice stream from the microphone to a digitized voice stream; and
a computer readable medium, coupled with the microprocessor and comprising microprocessor readable and executable instructions that program the microprocessor to:
identify, based on receiving the digitized voice stream from the microphone, a first keyword of a plurality of keywords in the digitized voice stream;
in response to identifying the first keyword of the plurality of keywords in the digitized voice stream:
identify a first communication address of a first communication server of a first service provider associated with the first keyword of the plurality of keywords in the digitized voice stream; and
route the digitized voice stream and/or information associated with the digitized voice stream to the first communication server of the first service provider using the first communication address.

The device wherein identifying the first keyword of the plurality of keywords in the digitized voice stream comprises identifying a second keyword of the plurality of keywords in the digitized voice stream that is spoken together with the first keyword of the plurality of keywords in the digitized voice stream and wherein the microprocessor readable and executable instructions further program the microprocessor to:
identify a second communication address of a second communication server of a second service provider associated with the second keyword of the plurality of keywords in the digitized voice stream; and
route the digitized voice stream and/or the information associated with the digitized voice stream to the second communication server of the service provider using the second communication address.

The device wherein the microprocessor readable and executable instructions further program the microprocessor to:
identify a second keyword of the plurality of keywords in the digitized voice stream;
in response to identifying the second keyword of the plurality of keywords in the digitized voice stream:
identify a second communication address of a second communication server of a second service provider associated with the second keyword of the plurality of keywords in the digitized voice stream; and
switching the routing of the digitized voice stream and/or the information associated with the digitized voice stream to the communication server of the second service provider using the second communication address.

The device wherein in response to identifying the first keyword of the plurality of keywords in the digitized voice stream causes the device to only route the first information associated with the digitized voice stream to the first service provider communication server until identifying the second keyword of the plurality of keywords in the digitized voice stream.

The device further comprising a timer that is based on a time period for not receiving voice in the digitized voice stream and wherein when the timer expires, the microprocessor readable and executable instructions further program the microprocessor to enter a listening mode to identify the first keyword and at least a second keyword of a plurality keywords in the digitized voice stream.

The device wherein in response to identifying the first keyword of the plurality of keywords in the digitized voice stream further comprises:
automatically, based on a profile, identify a second communication address of a second communication server of a second service provider; and
route the digitized voice stream and/or information associated with the digitized voice stream to the second communication server of the second service provider using the second communication address.

The device wherein the microprocessor readable and executable instructions further program the microprocessor to:
receive, from the first communication server of the first service provider a first response, wherein the first response indicates that a first inquiry was not answered; and
in response to the first response indicating that the first inquiry was not answered, asking a user if the user wants to receive a second response from a second service provider; and
in response to the user wanting to receive the receive the second response from the second service provider, route the digitized voice stream and/or information associated with the digitized voice stream to a second communication server of the second service provider using a second a device wherein routing the digitized voice stream and/or information associated with the digitized voice stream is routing the digitized voice stream.

The device wherein routing the digitized voice stream and/or information associated with the digitized voice stream is routing the information associated with the digitized voice stream and wherein the information associated with the digitized voice stream is voice-to-text conversion of the digitized voice stream.

The device wherein routing the digitized voice stream and/or information associated with the digitized voice stream does in include routing the first keyword in the digitized voice stream or the information associated with the digitized voice stream.

A processing server comprising:
a microprocessor; and
a computer readable medium, coupled with the microprocessor and comprising microprocessor readable and executable instructions that program the microprocessor to:
receive, via a network from a first listening device, a first digitized voice stream and/or information associated with the first digitized voice stream;
identify a first keyword of a plurality of keywords in the first digitized voice stream and/or the information associated with the first digitized voice stream; and
in response to identifying the first keyword of the plurality of keywords in the first digitized voice stream and/or the information associated with the first digitized voice stream:
identify a first communication address of a first communication server of a first service provider associated with the first keyword of the plurality of keywords; and
route the first digitized voice stream and/or the information associated with the first digitized voice stream using the first communication address of the first communication server of the first service provider.

The processing wherein microprocessor readable and executable instructions further program the microprocessor to:
receive, from a second listening device, a second keyword in a second digitized voice stream and/or second information associated with the second digitized voice stream;
identify a second keyword of a plurality of keywords in the second digitized voice stream and/or the information associated with the second digitized voice stream; and
in response to identifying the second keyword of the plurality of keywords in the second digitized voice stream and/or the information associated with the second digitized voice stream:
identify a second communication address of a second communication server of a second service provider associated with the second keyword of the plurality of keywords; and
route the second digitized voice stream and/or the information associated with the second digitized voice stream using the second communication address of the second communication server of the second service provider The processing server, wherein identifying the first keyword of the plurality of keywords in the first digitized voice stream comprises identifying a second keyword of the plurality of keywords in the first digitized voice stream that is spoken together with the first keyword of the plurality of keywords in the first digitized voice stream and wherein the microprocessor readable and executable instructions further program the microprocessor to:
identify a second communication address of a second communication server of a second service provider associated with the second keyword of the plurality of keywords in a second digitized voice stream; and
route the second digitized voice stream and/or the information associated with the second digitized voice stream to the second communication server of the service provider using the second communication address.

The processing server, wherein the microprocessor readable and executable instructions further program the microprocessor to:
identify a second keyword of the plurality of keywords in a second digitized voice stream; and
in response to identifying the second keyword of the plurality of keywords in the second digitized voice stream:
identify a second communication address of a second communication server of a second service provider associated with the second keyword of the plurality of keywords in the second digitized voice stream; and
switching the routing of the second digitized voice stream and/or the information associated with the second digitized voice stream to the second communication server of the second service provider using the second communication address.

The processing server, wherein in response to identifying the first keyword of the plurality of keywords in the first digitized voice stream causes the first listening device to only route the first information associated with the first digitized voice stream to the first communication server of the first service provider until identifying a second keyword of the plurality of keywords in the first digitized voice stream.

The processing server, further comprising a timer that is based on a time period for not receiving voice in the first digitized voice stream and wherein when the timer expires, the microprocessor readable and executable instructions further program the microprocessor to enter a listening mode to identify the first keyword and at least a second keyword of the plurality of keywords in the first digitized voice stream.

The processing server, wherein in response to identifying the first keyword of the plurality of keywords in the first digitized voice stream further comprises:
automatically, based on a profile, identify a second communication address of a second communication server of a second service provider; and
route the first digitized voice stream and/or the information associated with the first digitized voice stream to the second communication server of the second service provider using the second communication address.

The processing server, wherein the microprocessor readable and executable instructions further program the microprocessor to:
receive, from the first communication server of the first service provider a first response, wherein the first response indicates that a first inquiry was not answered; and
in response to the first response indicating that the first inquiry was not answered, asking a user if the user wants to receive a second response from a second service provider; and
in response to the user wanting to receive the second response from the second service provider, route the first digitized voice stream and/or the information associated with the first digitized voice stream to a second communication server of the second service provider using a second communication address.

A method of operating a listening device, the method comprising:
using a codec to convert an analog voice stream to a digitized voice stream;
identifying, based on the digitized voice stream, a first keyword of a plurality of keywords in the digitized voice stream; and
in response to identifying the first keyword of the plurality of keywords in the digitized voice stream:
identifying a first communication address of a first communication server of a first service provider associated with the first keyword of the plurality of keywords in the digitized voice stream; and routing the digitized voice stream and/or information associated with the digitized voice stream to the first communication server of the first service provider using the first communication address.

The method, further comprising:

identifying a second keyword of the plurality of keywords in the digitized voice stream that is spoken together with the first keyword of the plurality of keywords in the digitized voice stream;

identifying a second communication address of a second communication server of a second service provider associated with the second keyword of the plurality of keywords in the digitized voice stream; and routing the digitized voice stream and/or the information associated with the digitized voice stream to the second communication server of the second service provider using the second communication address.

A caching server comprising:

a microprocessor; and a computer readable medium, coupled with the microprocessor and comprising microprocessor readable and executable instructions that program the microprocessor to:

receive, via a network, from a plurality of listening devices, a plurality of digitized voice streams and/or information associated with the plurality of digitized voice streams;

identify a first keyword in a first digitized voice stream and/or first information associated with a first digitized voice stream of the plurality of digitized voice streams;

in response to identifying the first keyword:

identify a first service provider associated with the first keyword;

identify a first inquiry in the first digitized voice stream and/or the first information associated with the first digitized voice stream;

in response identifying the first service provider and the first inquiry, searching a first cache of the first service provider to identify a first response to the first inquiry;

in response to identifying the first response to the first inquiry in the first cache of the first service provider, sending the first response to a first listening device that originated the first digitized voice stream; and in response to not identifying the first response to the first inquiry in the first cache of the first service provider, identify a first communication address of a first communication server of the first service provider and route the first inquiry to the first communication server of the first service provider.

The caching server wherein searching the first cache of the first service provider to identify the first response to the first inquiry further comprises searching a second cache of a second service provider to identify the first response to the first inquiry.

The caching server wherein the first cache and the second cache are searched for inquiries that are not identical to the first inquiry, but are similar to the first inquiry.

The caching server wherein the first response to the first inquiry in the first cache of the first service provider was stored in the first cache of the first service provider based on a received response to the first inquiry by a second listening device.

The caching server wherein identifying the first keyword comprises identifying a second keyword that is spoken together with the first keyword of the plurality of keywords, wherein identifying the first service provider comprises identifying a second service provider, wherein searching the first cache of the first service provider comprises searching a second cache of a second service provider.

The caching server wherein sending the first response to the first listening device comprises sending a second response from the second cache of the second service provider to the first listening device.

The caching server wherein microprocessor readable and executable instructions further program the microprocessor to identify a second keyword in a second digitized voice stream and/or second information associated with the second digitized voice stream of the plurality of voice streams from a second listening device.

The caching server wherein identifying the first response to the first inquiry in the first cache of the first service provider and sending the first response to the first listening devices provides a faster overall response time.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A device comprising:
    a microprocessor;
    a microphone;
    a codec that converts an analog voice stream from the microphone to a digitized voice stream; and
    a non-transitory computer readable medium, coupled with the microprocessor and comprising microprocessor readable and executable instructions that program the microprocessor to:
        identify, based on receiving the digitized voice stream, a first keyword of a plurality of keywords in the digitized voice stream, wherein each of the plurality of keywords is associated with a different service provider;
        identify, based on the first keyword, a first communication address of a first communication server of a first service provider;
        route the digitized voice stream and/or information associated with the digitized voice stream to the first communication server of the first service provider using the first communication address;
        receive, from the first communication server of the first service provider a first response, wherein the first response indicates that a first inquiry was not answered;
        in response to receiving the first response indicating that the first inquiry was not answered, asking a user if the user wants to receive a second response from a second service provider; and
        in response to the user wanting to receive the second response from the second service provider, route the digitized voice stream and/or the information associated with the digitized voice stream to a second communication server of the second service provider using a second communication address.

2. The device of claim 1, wherein identifying the first keyword of the plurality of keywords in the digitized voice stream comprises identifying a second keyword of the plurality of keywords in the digitized voice stream that is spoken together with the first keyword of the plurality of keywords in the digitized voice stream and wherein the microprocessor readable and executable instructions further program the microprocessor to:
        identify a third communication address of a third communication server of a third service provider associated with the second keyword of the plurality of keywords in the digitized voice stream; and
        route the digitized voice stream and/or the information associated with the digitized voice stream to the third communication server of the third service provider using the third communication address.

3. The device of claim 1, wherein the microprocessor readable and executable instructions further program the microprocessor to:
        identify a second keyword of the plurality of keywords in the digitized voice stream; and
        in response to identifying the second keyword of the plurality of keywords in the digitized voice stream:
            identify a third communication address of a third communication server of a third second service provider associated with the second keyword of the plurality of keywords in the digitized voice stream; and
            switch the routing of the digitized voice stream and/or the information associated with the digitized voice stream to the third communication server of the third service provider using the third communication address.

4. The device of claim 3, wherein in response to identifying the first keyword of the plurality of keywords in the digitized voice stream causes the device to only route the information associated with the digitized voice stream to the first service provider and the first communication server until identifying the second keyword of the plurality of keywords in the digitized voice stream.

5. The device of claim 1, further comprising a timer that is based on a time period for not receiving voice in the digitized voice stream and wherein when the timer expires, the microprocessor readable and executable instructions further program the microprocessor to enter a listening mode to identify the first keyword and at least a second keyword of the plurality keywords in the digitized voice stream.

6. The device of claim 1, wherein in response to identifying the first keyword of the plurality of keywords in the digitized voice stream executable instructions further program the microprocessor to:
        automatically, based on a profile, identify a third communication address of a third communication server of a third service provider; and
        route the digitized voice stream and/or the information associated with the digitized voice stream to the third communication server of the third service provider using the third communication address.

7. The device of claim 1, wherein routing the digitized voice stream and/or the information associated with the digitized voice stream comprises routing the digitized voice stream.

8. The device of claim 1, wherein routing the digitized voice stream and/or the information associated with the digitized voice stream comprises routing the information associated with the digitized voice stream and wherein the information associated with the digitized voice stream is voice-to-text conversion of the digitized voice stream.

9. The device of claim 1, wherein routing the digitized voice stream and/or the information associated with the digitized voice stream includes routing the first keyword in the digitized voice stream or in the information associated with the digitized voice stream.

10. A processing server comprising:
a microprocessor; and
a non-transitory computer readable medium, coupled with the microprocessor and comprising microprocessor readable and executable instructions that program the microprocessor to:
receive, via a network from a first listening device, a first digitized voice stream and/or information associated with the first digitized voice stream;
identify a first keyword of a plurality of keywords in the first digitized voice stream and/or the information associated with the first digitized voice stream, wherein each of the plurality of keywords is associated with a different service provider;
identify, based on the first keyword, a first communication address of a first communication server of a first service provider;
route the first digitized voice stream and/or the information associated with the first digitized voice stream using the first communication address of the first communication server of the first service provider;
receive, from the first communication server of the first service provider a first response, wherein the first response indicates that a first inquiry was not answered;
in response to receiving the first response indicating that the first inquiry was not answered, asking a user if the user wants to receive a second response from a second service provider; and
in response to the user wanting to receive the second response from the second service provider, route the digitized voice stream and/or the information associated with the digitized voice stream to a second communication server of the second service provider using a second communication address.

11. The processing server of claim 10, wherein microprocessor readable and executable instructions further program the microprocessor to:
receive, from a second listening device, a second keyword in a second digitized voice stream and/or second information associated with the second digitized voice stream;
identify the second keyword of the plurality of keywords in the second digitized voice stream and/or the second information associated with the second digitized voice stream; and
in response to identifying the second keyword of the plurality of keywords in the second digitized voice stream and/or the second information associated with the second digitized voice stream:
identify a third communication address of a third communication server of a third service provider associated with the second keyword of the plurality of keywords; and
route the second digitized voice stream and/or the second information associated with the second digitized voice stream using the third communication address of the third communication server of the third service provider.

12. The processing server of claim 10, wherein identifying the first keyword of the plurality of keywords in the first digitized voice stream comprises identifying a second keyword of the plurality of keywords in the first digitized voice stream that is spoken together with the first keyword of the plurality of keywords in the first digitized voice stream and wherein the microprocessor readable and executable instructions further program the microprocessor to:
identify a third communication address of a third communication server of a third service provider associated with the second keyword of the plurality of keywords in the second first digitized voice stream; and
route the second first digitized voice stream and/or the information associated with the second first digitized voice stream to the third communication server of the third service provider using the third communication address.

13. The processing server of claim 10, wherein the microprocessor readable and executable instructions further program the microprocessor to:
identify a second keyword of the plurality of keywords in a second digitized voice stream; and
in response to identifying the second keyword of the plurality of keywords in the second digitized voice stream:
identify a third communication address of a third communication server of a third service provider associated with the second keyword of the plurality of keywords in the second digitized voice stream; and
switch the routing of the second digitized voice stream and/or second information associated with the second digitized voice stream to the third communication server of the third service provider using the third communication address.

14. The processing server of claim 10, wherein in response to identifying the first keyword of the plurality of keywords in the first digitized voice stream causes the first listening device to only route the first information associated with the first digitized voice stream to the first communication server of the first service provider until identifying a second keyword of the plurality of keywords in the first digitized voice stream.

15. The processing server of claim 10, further comprising a timer that is based on a time period for not receiving voice in the first digitized voice stream and wherein when the timer expires, the microprocessor readable and executable instructions further program the microprocessor to enter a listening mode to identify the first keyword and at least a second keyword of the plurality of keywords in the first digitized voice stream.

16. The processing server of claim 10, wherein in response to identifying the first keyword of the plurality of keywords in the first digitized voice stream further comprises:
automatically, based on a profile, identify a third communication address of a third communication server of a third service provider; and
route the first digitized voice stream and/or the information associated with the first digitized voice stream to the third communication server of the third service provider using the third communication address.

17. A method of operating a listening device, the method comprising:
using a codec to convert an analog voice stream to a digitized voice stream;
identifying, based on the digitized voice stream, a first keyword of a plurality of keywords in the digitized voice stream, wherein each of the plurality of keywords is associated with a different service provider;
identifying, based on the first keyword, a first communication address of a first communication server of a first service provider;

routing the digitized voice stream and/or information associated with the digitized voice stream to the first communication server of the first service provider using the first communication address;

receiving, from the first communication server of the first service provider a first response, wherein the first response indicates that a first inquiry was not answered;

in response to receiving the first response indicating that the first inquiry was not answered, asking a user if the user wants to receive a second response from a second service provider; and in response to the user wanting to receive the second response from the second service provider, routing the digitized voice stream and/or the information associated with the digitized voice stream to a second communication server of the second service provider using a second communication address.

18. The method of claim 17, further comprising:

identifying a second keyword of the plurality of keywords in the digitized voice stream that is spoken together with the first keyword of the plurality of keywords in the digitized voice stream;

identifying a third communication address of a third communication server of a third service provider associated with the second keyword of the plurality of keywords in the digitized voice stream; and routing the digitized voice stream and/or the information associated with the digitized voice stream to the third communication server of the third service provider using the third communication address.

* * * * *

UNITED STATES PATENT AND TRADEMARK OFFICE
CERTIFICATE OF CORRECTION

PATENT NO. : 11,064,006 B2  
APPLICATION NO. : 16/682492  
DATED : July 13, 2021  
INVENTOR(S) : Mesut Gorkem Eraslan et al.

Page 1 of 1

It is certified that error appears in the above-identified patent and that said Letters Patent is hereby corrected as shown below:

In the Claims

Claim 3, Column 18, Line 18, delete "third second" and insert --third-- therein.
Claim 12, Column 20, Lines 6-8, delete all instances of "second" therein.
Claim 14, Column 20, Line 33, delete "first information" and insert --information-- therein.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*